United States Patent
Castleberry et al.

(10) Patent No.: US 7,436,835 B2
(45) Date of Patent: Oct. 14, 2008

(54) FORCED BEARER ROUTING FOR PACKET-MODE INTERCEPTION

(75) Inventors: Michael Ray Castleberry, Wheaton, IL (US); Daniel Weiler Eustace, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 864 days.

(21) Appl. No.: 10/448,909

(22) Filed: May 30, 2003

(65) Prior Publication Data

US 2004/0240439 A1 Dec. 2, 2004

(51) Int. Cl.
*H04L 12/56* (2006.01)

(52) U.S. Cl. .................. 370/392; 370/475; 379/213.01; 379/211.01

(58) Field of Classification Search ............ 379/213.01, 379/211.01
See application file for complete search history.

(56) References Cited

U.S. PATENT DOCUMENTS

| | | | | |
|---|---|---|---|---|
| 6,553,025 B1 * | 4/2003 | Kung et al. | .................. | 370/352 |
| 6,560,224 B1 * | 5/2003 | Kung et al. | .................. | 370/356 |
| 6,650,641 B1 * | 11/2003 | Albert et al. | ................. | 370/392 |
| 6,993,015 B2 * | 1/2006 | Kobayashi | .................. | 370/353 |
| 7,006,508 B2 * | 2/2006 | Bondy et al. | ................. | 370/410 |
| 7,151,772 B1 * | 12/2006 | Kalmanek et al. | ........... | 370/390 |
| 2001/0052081 A1 * | 12/2001 | McKibben et al. | .......... | 713/201 |
| 2003/0179747 A1 * | 9/2003 | Pyke et al. | .................. | 370/389 |
| 2003/0219103 A1 * | 11/2003 | Rao et al. | ................. | 379/32.05 |
| 2004/0165709 A1 * | 8/2004 | Pence et al. | ............ | 379/201.01 |
| 2004/0203582 A1 * | 10/2004 | Dorenbosch et al. | ........ | 455/406 |
| 2006/0222158 A1 * | 10/2006 | Nagaraja | ............... | 379/213.01 |

* cited by examiner

*Primary Examiner*—Wing F. Chan
*Assistant Examiner*—Brian Roberts

(57) ABSTRACT

A method of intercepting call content in a packet-based Internet Protocol (IP) network. The method includes targeting bearer packets containing the call content via a Softswitch controlling the redirection of the targeted bearer packets through a specified Intercept Router using alias IP addresses for the targeted bearer packets.

18 Claims, 7 Drawing Sheets

US 7,436,835 B2

FORCED BEARER ROUTING FOR PACKET-MODE INTERCEPTION

The present invention relates to a routing bearer packets in an IP network and more particularly to a redirecting bearer method of targeting bearer packets containing the call content controlling the redirection through a specified Intercept Router using alias IP addresses for the targeted bearer packets for legal interception.

In October, 1994, the U.S. Congress enacted the Communications Assistance for Law Enforcement Act (CALEA), which requires telecommunications service providers to assist Law Enforcement Agencies (LEAs) in executing legal intercepts of the telephone communications of a person referred to herein as the target. Many other countries have similar laws. The intercepted telephone communications are communications made between the target and others known as associates. The target may call the associate, or the associate may call the target.

When a LEA has a legitimate need to monitor a target party's telephone communications, it must obtain a court order specifying whether the LEA is authorized to receive just the target party's call identifying information, or if it may also receive the voice stream. When the LEA sends a court order to a service provider, the service provider must provide the information for all of the target party's calls, such that neither the target party, non-security service provider employees, nor other LEAs are aware that the target party's calls are being intercepted. If the service provider cannot begin providing this information within a reasonable time, they can be fined. The end result is that service providers cannot deploy any new switch as a local switch unless it can support legal intercepts.

A lawful intercept of call content for packet-based networks is problematic in that the network element managing calls, known as the Softswitch, does not have access to the bearer packets, nor can it typically control the path those packets take within an IP network. A circuit switch, such as a SS7 switch in a TDM network, has direct access to the voice stream so that it is relatively easy for it to copy the voice stream and forward it to the LEA. A Softswitch only performs call control and does not have direct access to the voice stream. It is desirable to provide a manner of intercepting call content in IP networks.

Further, the service providers do not receive significant revenue for the LEAs for legal intercepts, so it is desirable to make use of existing network elements to contain costs associated with providing legal intercepts.

SUMMARY OF THE INVENTION

According to the present invention, a method of intercepting call content in a packet-based IP network is provided.

The method includes targeting bearer packets containing the call content via a Softswitch controlling the redirection of the targeted bearer packets through a specified Intercept Router using alias IP addresses for the targeted bearer packets.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention may take form in certain components and structures, preferred embodiments of which will be illustrated in the accompanying drawings wherein.

DETAILED DESCRIPTION OF THE INVENTION

Figure 1:
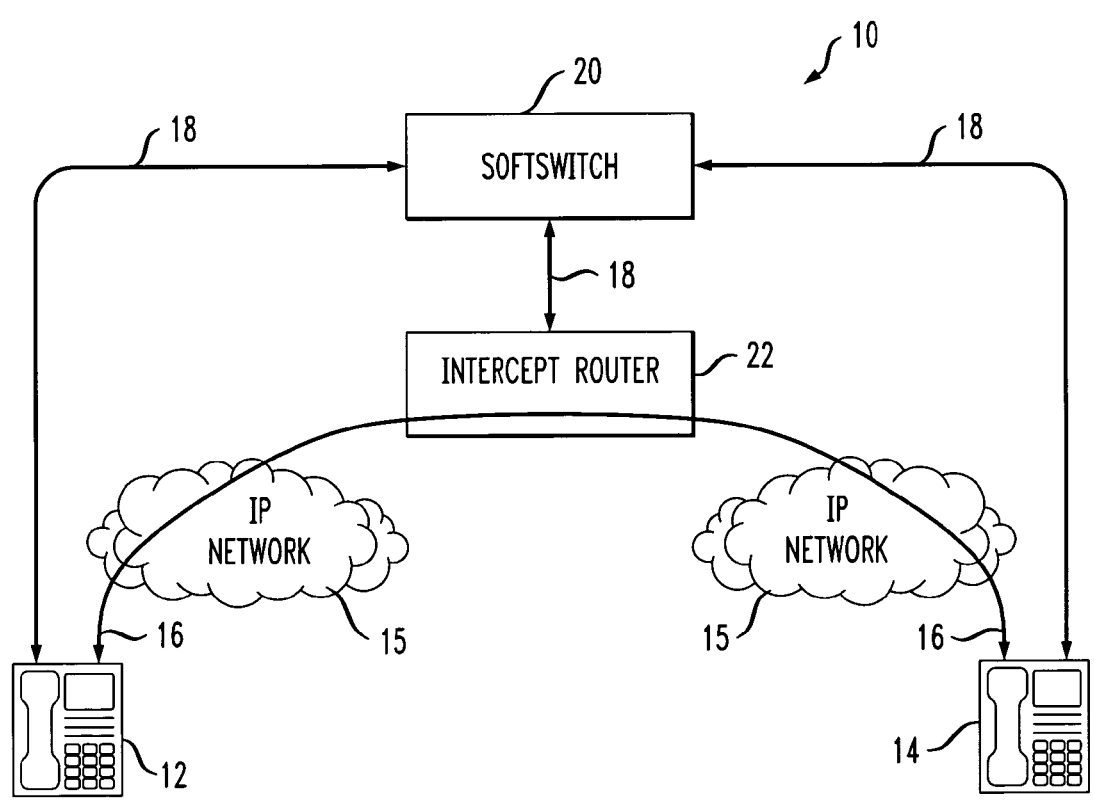
FIG. 1 illustrates a portion of a communications network including an IP network in accordance with the invention.

Referring now to FIG. 1, a portion of a packet-based communications network shown generally at 10, provides communication between the target 12 and the associate 14 over an IP network 15. The packet-based network 10 can be any network in which the call content or voice content travels in bearer packets over a bearer path 16 that is different than the signaling path shown at 18 taken by the control signaling. The signaling path 18 can traverse an IP network (not shown). Examples of the packet-based network can include wireline or wireless communications networks. In today's networks, media can also be sent over the bearer path. In this embodiment of the invention, the target 12 and associate 14 are using communications terminals, such as phones, considered by the network 10 to be IP endpoints.

The network 10 includes a Softswitch 20 for controlling the signaling portion of the communication between the target 12 and the associate 14. The Softswitch 20, also known as a media gateway controller, call agent, or call server, can be any network element that controls call completion and call features via control signaling to other network elements such as Media Gateways and IP telephones. Softswitches can be responsible for these functions as they relate to packet-mode communications or the interworking between packet-mode networks and circuit-mode networks. Every phone is assigned to an associated Softswitch 20 and the Softswitch referred to herein is the Softswitch assigned to the target. The Softswitch 20 communicates with and controls other network elements, as shall be described in further detail below, that provide the switching needed to form the bearer path 16. The Softswitch 20 uses the target's IP address, referred to herein as A, and the associate's IP address, referred to herein as B, to tell each endpoint where to send its packets. The IP addresses A and B can be either IP addresses or IP addresses and a UDP port number.

The Softswitch 20 communicates with an Intercept Router 22 targeting bearer packets from both the target 12 and the associate 14 containing the call content. The Intercept Router 22 can be any suitable known router in the service provider's communication network 10, such as an edge router. In accordance with the invention, a particular router in the network is designated as the Intercept Router 22.

The Softswitch 20 uses alias IP addresses for the targeted bearer packets, as described below, to redirect the targeted bearer packets through the Intercept Router 22 before they are sent on to their destination. Once the bearer packets are forced to route through the Intercept Router 22, the call content can easily be reviewed, recorded, forwarded to an LEA agency, etc. using any suitable known technique.

Figure 2:
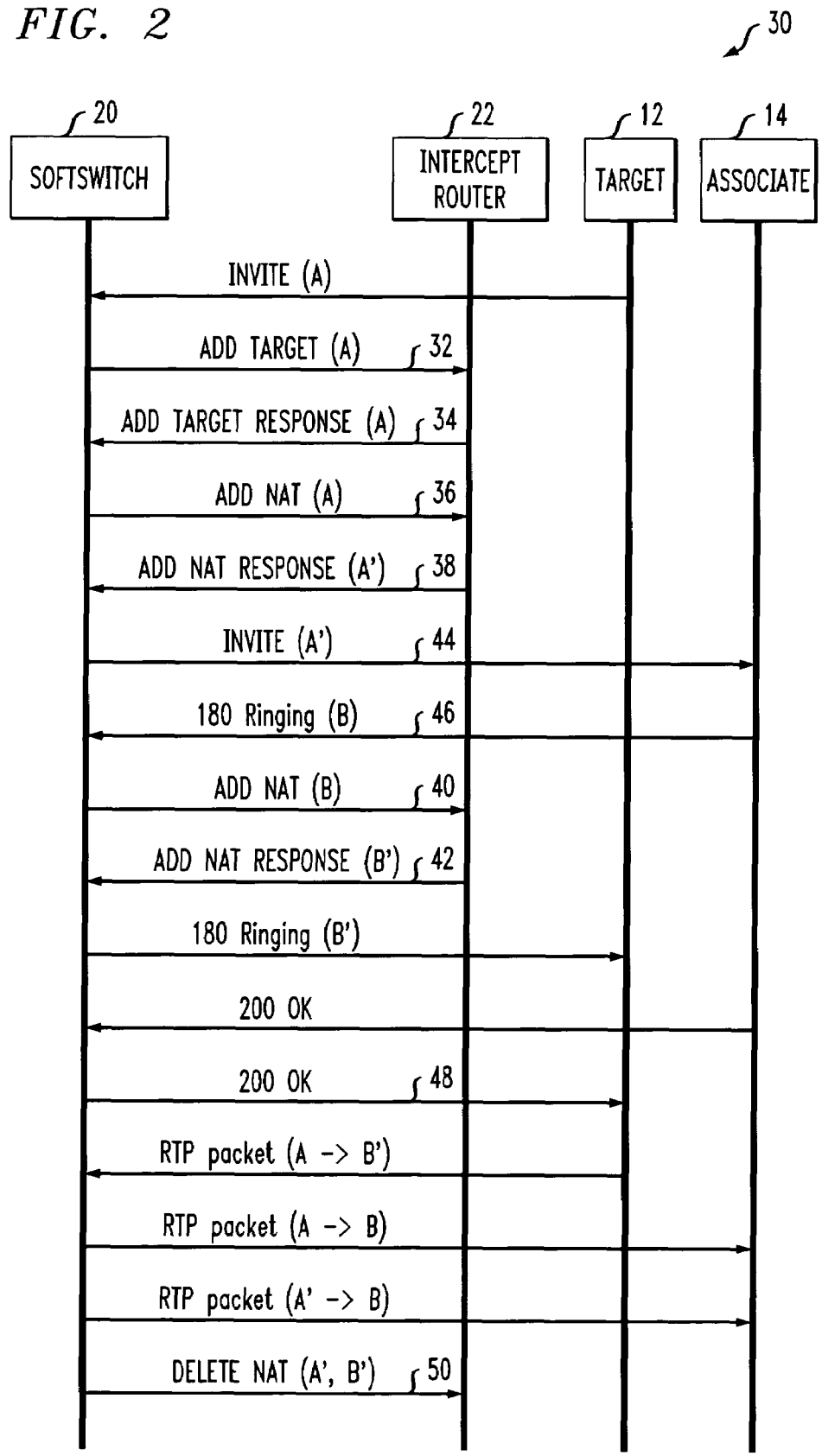
FIG. 2 illustrates message flow of a first embodiment of the invention.

Referring now to FIG. 2, a message flow illustrating the invention is shown at 30. The messages are sent over TCP/IP or UDP/IP in real-time on a per-call basis. In this embodiment, the target 12 places a call to the associate 14. When the Softswitch receives the call control information (INVITE) from the target 12 placing the call, the Softswitch identifies the destination IP address of the call as belonging to the target 12 and determines that the call is to be intercepted.

At 32, the Softswitch 20 sends the Intercept Router 22 an AddTargets message with the IP address and port number of the target 12, hereinafter referred to as the target's address A. The Intercept Router sends the Softswitch an Add Target response at 34.

At 36, the Softswitch sends the Intercept Router an Add-NAT message including the target address A to create an alias IP address A'. The alias IP address A' is chosen from a pool of address that the other routers (not shown) in the communications network 10 know are to be routed through the Intercept Router 22. At 38, the Intercept Router 22 sends the Softswitch 20 an AddNAT response including the alias address A' it chose from the pool. The Intercept Router 22 then holds the NAT mapping of the target address A mapped to the alias address A' in it's internal NAT tables for the duration of the call so that the Intercept Router knows to route bearer packets it receives having the IP address A' to the target at the IP address A. The other routers in the network know to route bearer packets having the address A' to the Intercept Router, and since the Intercept Router has the NAT tables mapping A' to A, the bearer packets are routed first to the Intercept Router where they can be intercepted and then on to the target at address A.

Similarly, at 40 the Softswitch sends the Intercept Router an AddNAT message including the associate's IP address B to create an alias IP address B'. The Intercept Router sends the Softswitch an AddNAT response including the alias address B' at 42. The alias IP address B' is also chosen from the same pool of addresses for routing bearer packets through the Intercept Router 22. The alias IP address B' routes the call content destined for the associate through the Intercept Router then to the associate as shown by the bearer path 16 so that the call content can be intercepted at the Intercept Router.

Finally, the target and associate alias IP addresses A' and B' are used in the signaling for the target 12 and associate 14, so that the typical call control messages use the alias addresses A' and B'. In this manner, each endpoint is told to send bearer packets to the alias IP addresses A' and B'. For example, the Invite message at 44 uses the target's alias address A' thereby sending the call content destined for the target through the Intercept Router. The 180 message, signaling ringing, uses the associate's alias address B' at 46. RTP packets having the alias addresses A' and B' are shown at 49 representing call content contained in bearer packets, with the notation such as A->B' indicating source and destination respectively. Therefore, in accordance with the invention, the addresses A and B are used in the signaling from the endpoints to the softswitch and A' and B' are used in the signaling from the softswitch to the endpoints.

This embodiment can also apply to the associate 14 calling the target 14 by using the appropriate alias addresses for the signaling messages 44-48.

After the call ends, the Softswitch sends the Intercept Router Delete NAT messages at 50 to remove the special temporary NAT mappings for the alias addresses A to A' and B to B'. A Delete Target message is also sent to the Intercept Router 22 telling it to stop searching for the target address.

Figure 3:
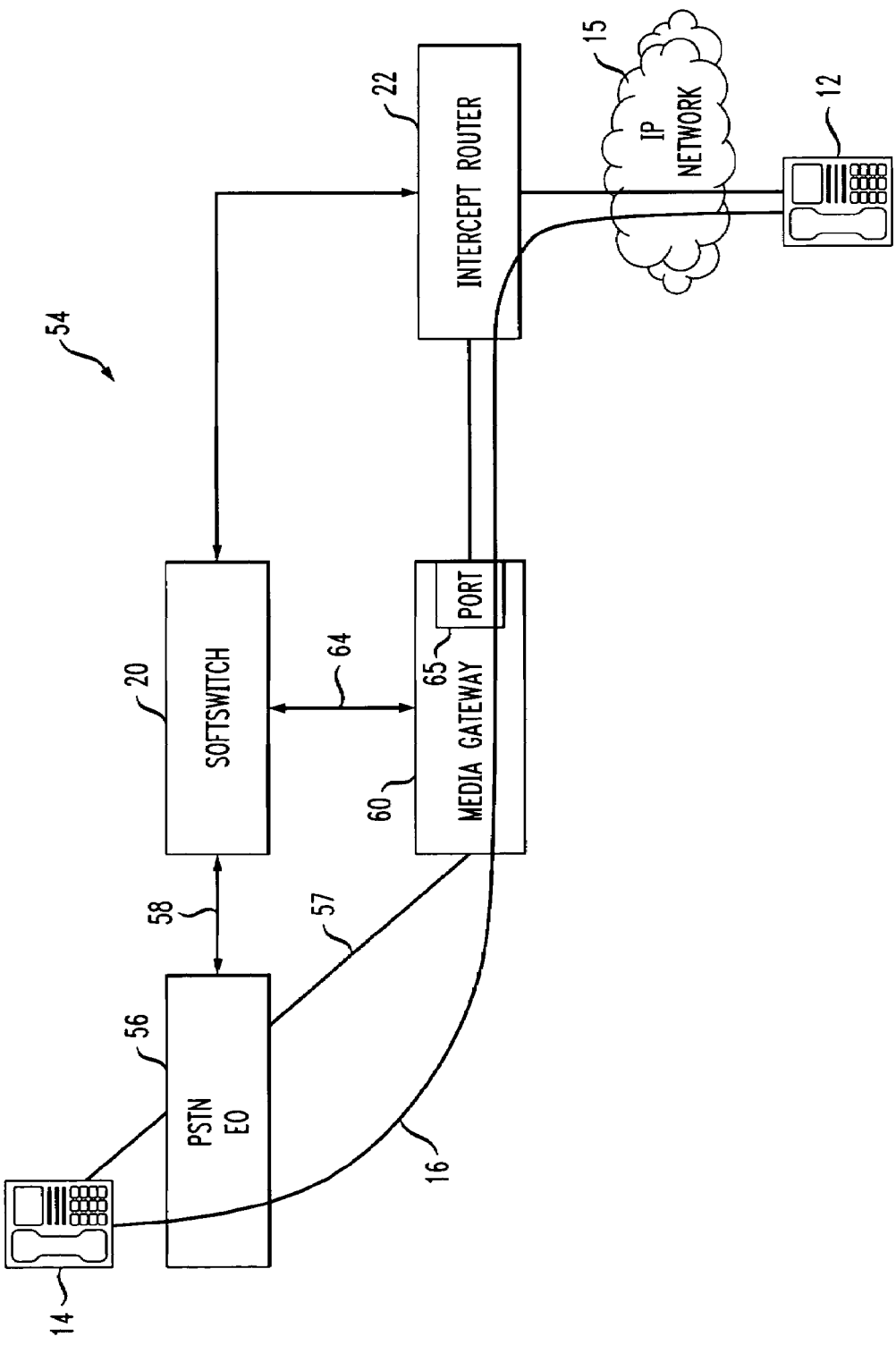
FIG. 3 illustrates a portion of a communications network including an IP network in accordance with the invention.

Referring now to FIG. 3, a block diagram showing a portion of the communications network 10 illustrating a second embodiment shown generally at 54 in which the associate 14, using the Public Switched Telephone Network (PSTN), is calling the target 12 which is acting as an IP endpoint in an IP network 15. The associate 14 is connected to a circuit switch in the PSTN, such as an End Office shown at 56. The call content comes from the PSTN over a trunk 57 which can be a known TDM trunk. The signaling portion of the call follows the SS7 control signaling path 58 to the Softswitch 20. The Media Gateway 60 converts the circuit switched call content from the associate 14 into IP bearer packets for transmission over the bearer path 16 in the IP network 15 via a Media Gateway port shown at 65. The Media Gateway 60 and Softswitch 20 communicate with each other sending control messages over connection 64 using any suitable known protocol such as H.248.

Figure 4:
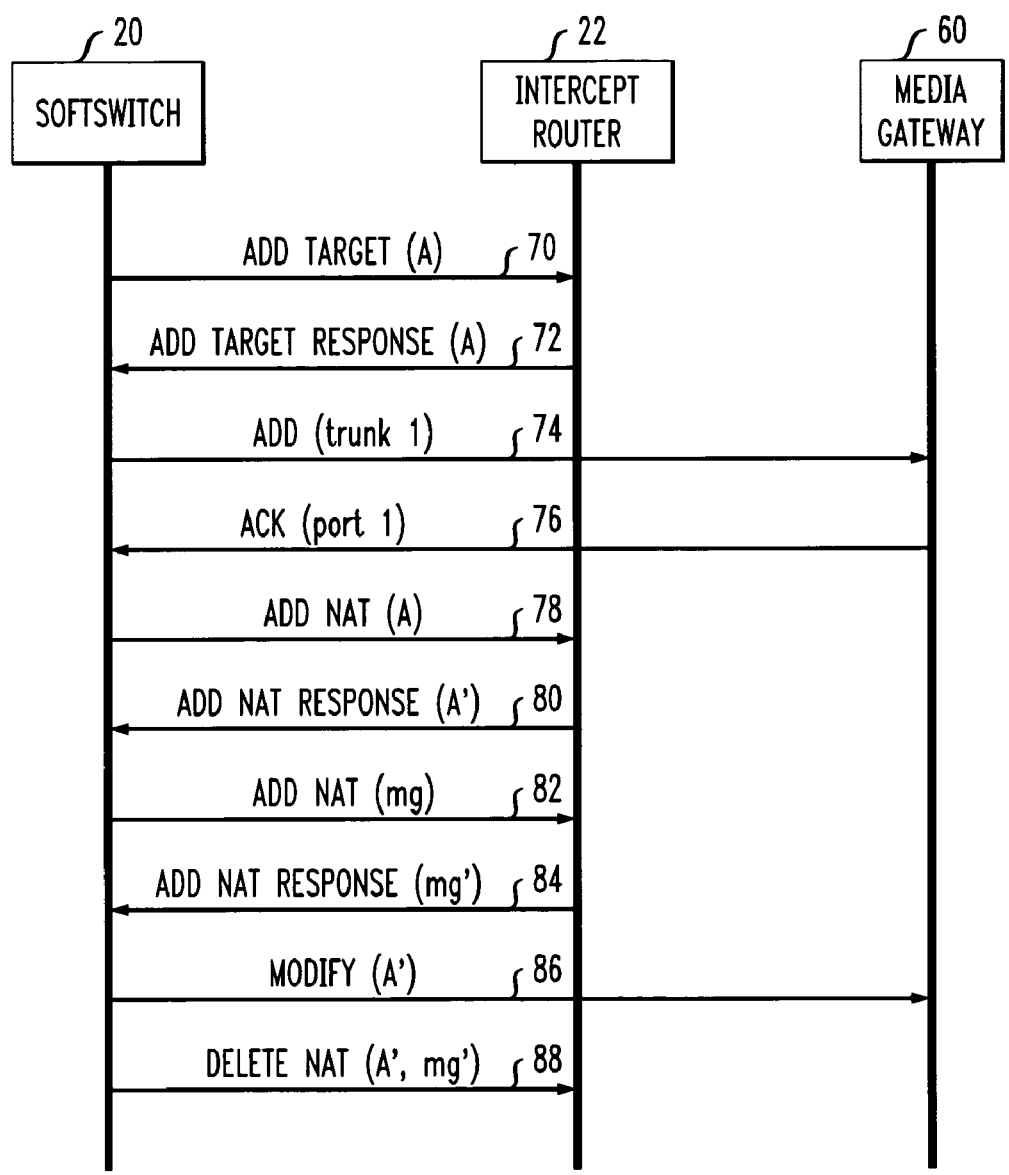
FIG. 4 illustrates message flow of a second embodiment of the invention.

Referring now to FIG. 4, a message flow illustrating the invention for the embodiment shown in FIG. 3 is shown generally at 68. The Softswitch has an internal table that maps the target's directory number to the target's IP address in a known manner. When the associate makes the call to the target, the associated Softswitch 20 gets a SS7 Initial Address message. The Softswitch 20 then looks at the dialed digits in that message and determines that the call is destined to a subscriber that the Softswitch controls and that the subscriber is a target 12 for interception.

The Softswitch 20 then sends an Add Target message at 70 to the Intercept Router 22 telling the Intercept Router that any bearer packets to or from the target's IP address A should be intercepted. The Intercept Router responds with an Add Target Response at 72. The Add Target message 70 contains the IP address and can optionally contain the port number of the target. The Add Target message can also include a list of LEA addresses and ports that have received the court order to intercept the target telecommunications. Once the Intercept Router 22 receives an Add Target message, it looks at the source and destination addresses of every packet that goes through it. When it finds a packet that has the address/port that was in the Add Target message it forwards copies of the packet to all LEAs on the list.

Next, a typical Media Gateway communication is made between the Softswitch and the Media Gateway to set up the call, establishing a link between the trunk1 57 and a port 65 on the Media Gateway 60. The Softswitch 20 sends the Media Gateway 60 an add(trunk1) message at 74 and the Media Gateway responds with an acknowledgement including the Media Gateway port number port1 at 76.

Next the Softswitch 20 sends the Intercept Router 22 an AddNAT message at 78 including the target address A to create an alias IP address A' in a similar manner as described above. At 80, the Intercept Router 22 sends the Softswitch an AddNAT response including the alias address A' it chose from the pool. Further, the Softswitch sends the Intercept Router an AddNAT message at 82 including the target address of the Media Gateway mg to create an alias IP address for the Media Gateway mg'. At 84, the Intercept Router 22 sends the Softswitch an AddNAT response including the Media Gateway's alias address mg'. Similar to the alias addresses chosen above, the edge router selects the Media Gateway's alias address from a pool of addresses which all routers know results in routing bearer packets to the Intercept Router.

The Intercept Router 22 then holds the NAT mapping of the target address A mapped to the alias address A' and the Media Gateway address mg mapped to mg' in it's internal NAT tables for the duration of the call so that the Intercept Router knows to route bearer packets it receives having the IP address A' to the IP address A and packets addressed to the Media Gateway address mg' to the Media Gateway address mg.

At 86, the Softswitch sends a Modify (A') message to the Media Gateway explaining that everything coming in on trunk1 needs to be converted to bearer packets and sent on to A'. Typical call control messages are then sent using the alias addresses A' and mg'. After the call ends, the Softswitch sends the Intercept Router Delete NAT messages at 88 to remove the special temporary NAT mappings for the alias addresses A' and mg'.

Figure 5:
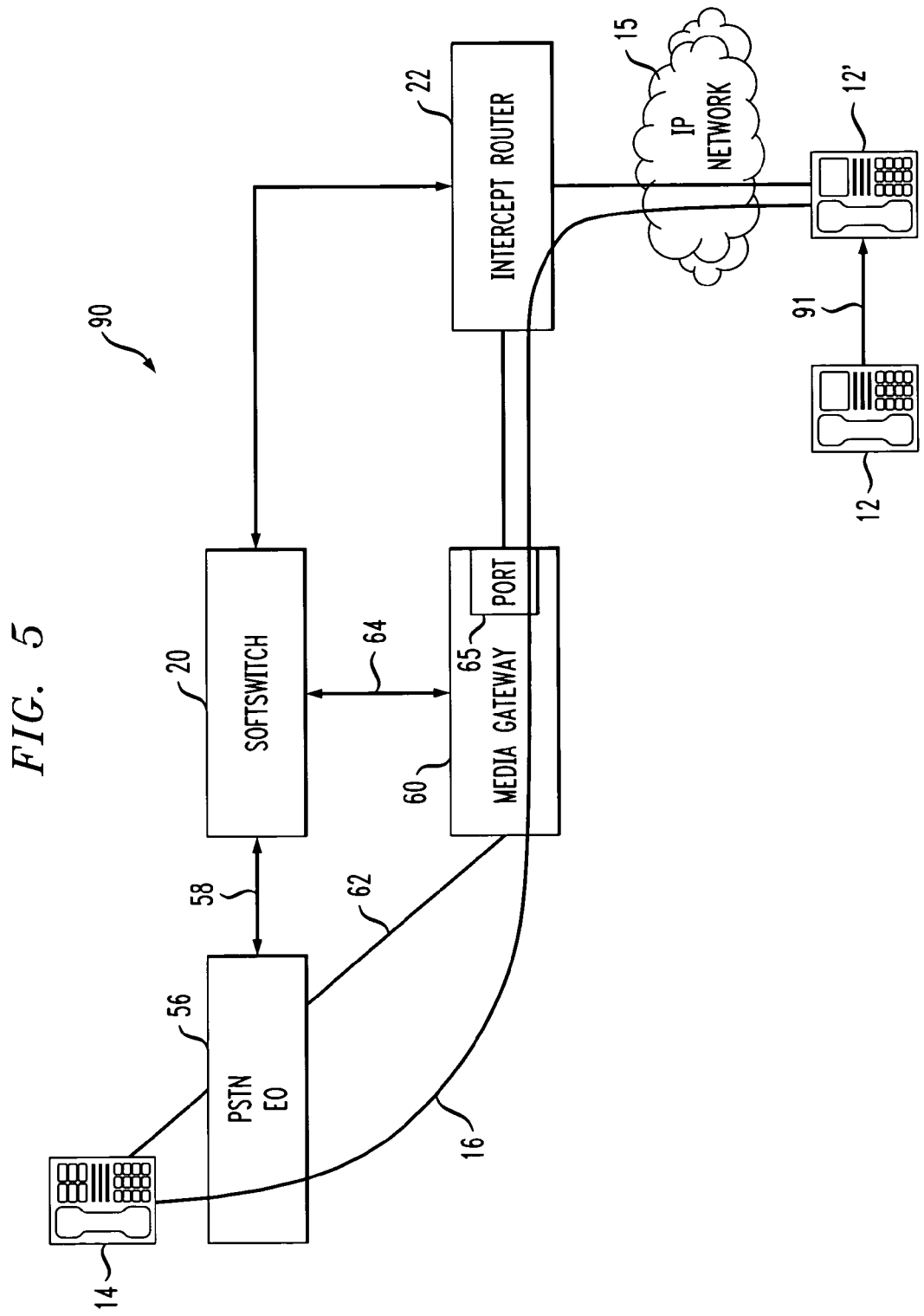
FIG. 5 illustrates a portion of a communications network including an IP network in accordance with the invention.

Referring now to FIG. 5, a block diagram showing a portion of the communications network 10 illustrating a third embodiment shown generally at 90 in which the associate 14, using the PSTN, is calling the target 12. However, the target is forwarding calls as shown by arrow 91 to forwarded target 12' which is acting as an IP endpoint in an IP network 15.

The message flow is similar to the message flow 68 described above, however the Add Target message sent from the Softswitch 20 to the Intercept Router 22 is Add Target (mg, port1) which contains the Media Gateway IP address mg and UDP port number port1 of the Media Gateway port 65 telling the Intercept Router that any bearer packets to or from the target's IP address, which is now associated with the Media Gateway's IP address and port number port1 should be intercepted.

Figure 6:
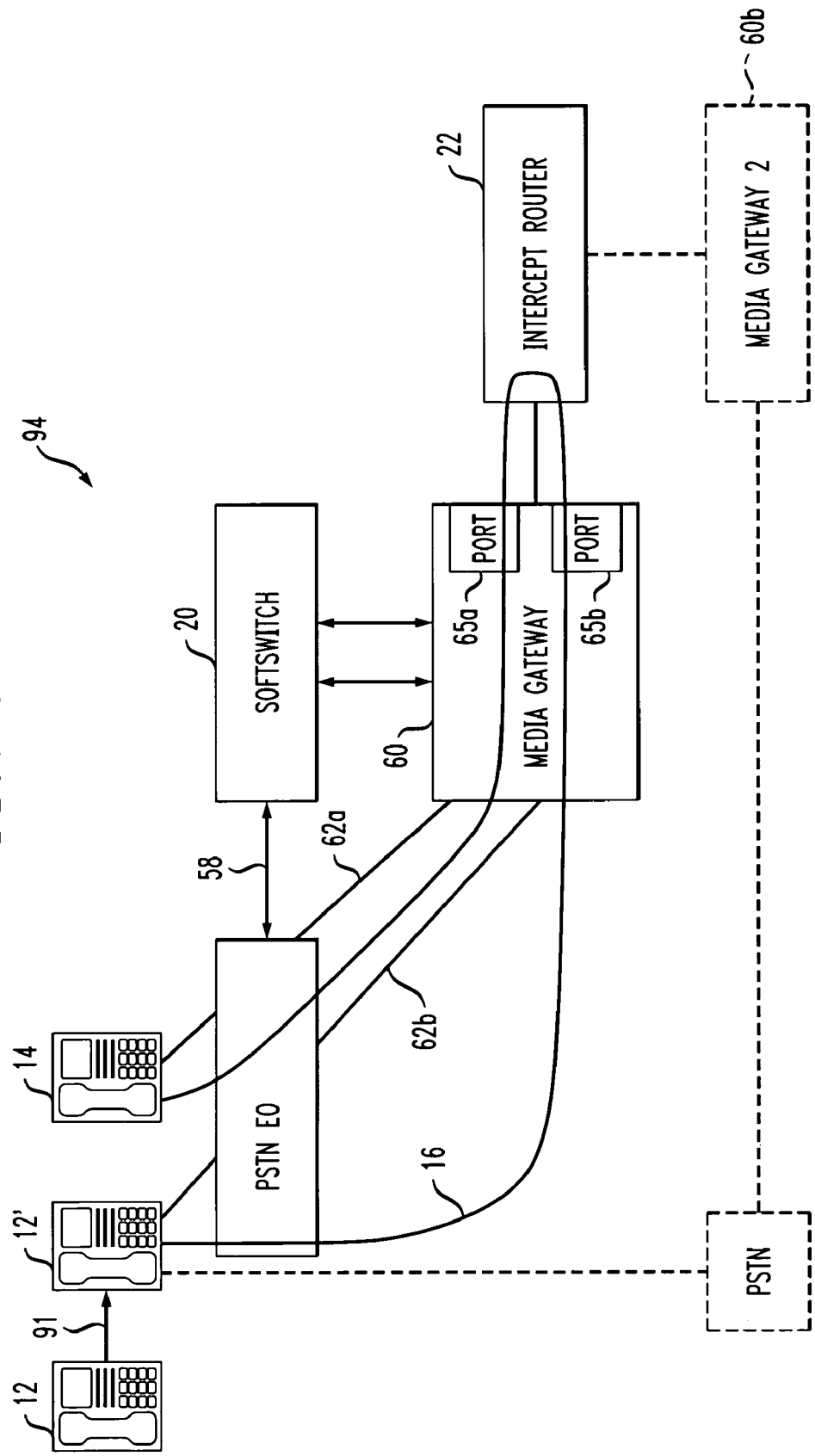
FIG. 6 illustrates a portion of a communications network including an IP network in accordance with the invention.

Referring now to FIG. 6, a call block diagram showing a portion of the communications network 10 illustrating another call forwarding embodiment is shown generally at 94. The target 12 is forwarding calls to forwarded target 12' as shown by arrow 91. The target 12 is an IP endpoint associated with Softswitch 20, but the forwarded target 12' is using the PSTN. The associate 14 calls the target 12 using the PSTN and the call is forwarded to forwarded target 12'.

Since the call is coming from and going back to the PSTN, the bearer packets may not reach a router that could intercept them since the bearer packets could remain on the Media Gateway's Local Area Network. The invention uses alias IP addressing to force the bearer packets to be routed out of the Media Gateway to the Intercept Router.

Figure 7:
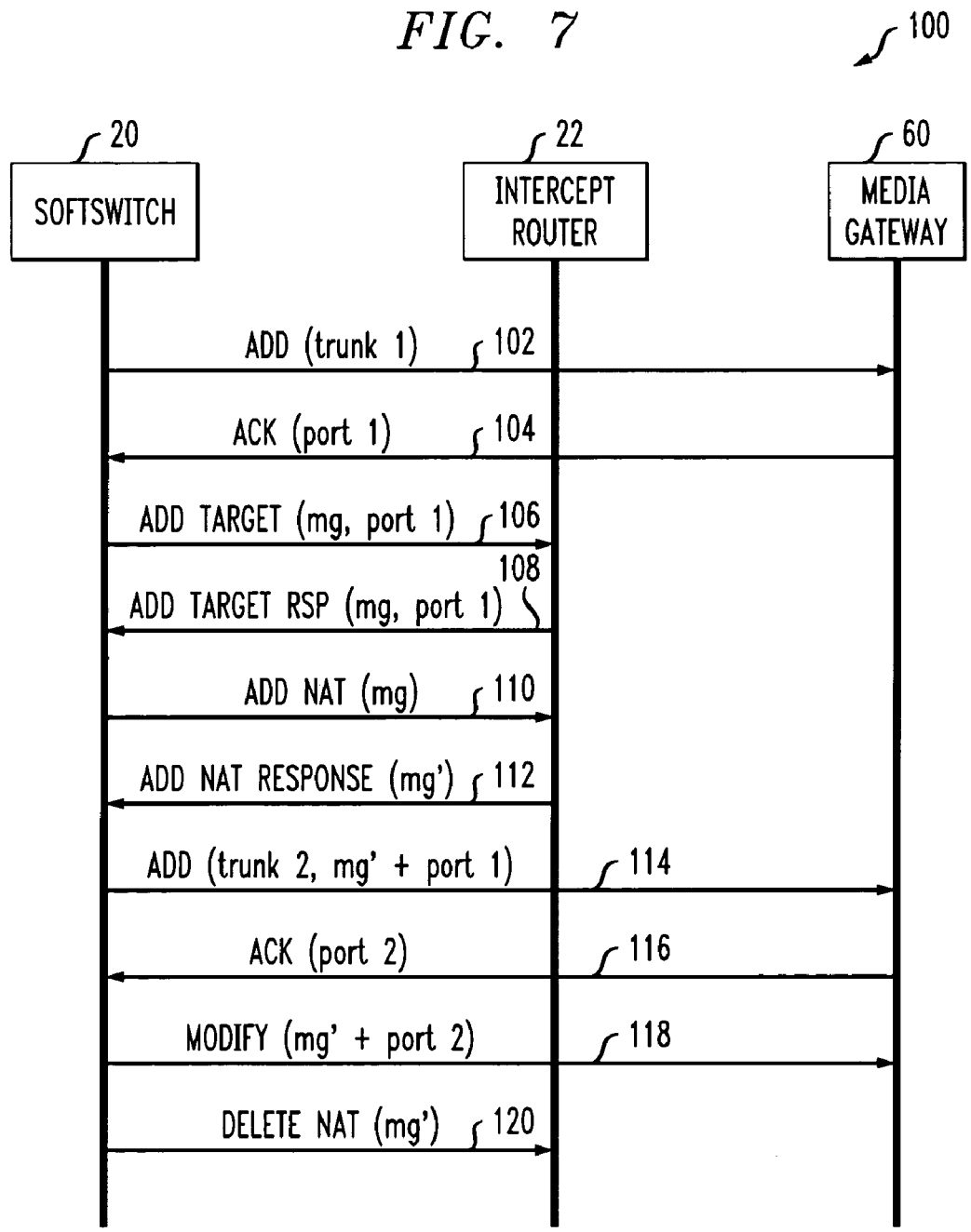
FIG. 7 illustrates message flow of another embodiment of the invention.

Referring now to FIG. 7, a message flow illustrating the invention for the call forwarding embodiment shown at 94 is shown generally at 100. The messages are sent over TCP/IP or UDP/IP. When the associate 14 makes the call to the target 12, the associated Softswitch 20 gets a SS7 Initial Address message similar to that described above. The Softswitch then looks at the dialed digits in that message and determines that the call is destined to a subscriber that the Softswitch controls and that the subscriber is a target for interception and that the target 12 has call forwarding activated and that the call is being forwarded to forwarded target 12'.

At 102, the Softswitch 20 sends the Media Gateway 60 control messages, such as ADD (trunk1), to initiate a connection from trunk1 to the Media Gateway. The Media Gateway 60 sends the Softswitch 20 an acknowledgement which includes the Media Gateway port number used such as port1 at 104.

An AddTargets message with the IP address (mg) of the Media Gateway and the port number (port1) of the target, in this embodiment the Media Gateway 60, returned from the Media Gateway is sent from the Softswitch 20 to the Intercept Router 22 at 106. An AddTargets Response is sent back to the Softswitch 20 at 108.

At 110, the Softswitch 20 sends the Intercept Router 22 an AddNAT message to create an alias IP address mg' for the target's address mg. The alias IP addresses mg' routes the call content destined for the target through the Intercept Router so that the call content can be intercepted. The Intercept Router sends the Softswitch an AddNAT response including the alias address mg' at 112.

At 114, the Softswitch sends control messages to the Media Gateway, such as ADD (trunk2, mg'+port1), to arrange for the second port of the path. The Media Gateway 60 sends an acknowledgement which includes the second port number port2 of the second port of the bearer path 16.

At 116, the Softswitch 20 sends the Media Gateway 60 a message, such as MODIFY(mg'+port2), propagating the returned port number port2 along with the alias address mg' to the incoming Media Gateway to be associated with the Media Gateway port. This tells the Media Gateway where to route the packets it is converting to. The call content comes in over trunk1 and is converted into packets by the Media Gateway 60, and goes from UDP port1 65a to the Intercept Router 22 and then back to UDP port2 65b of the Media Gateway. This information is placed in the destination address of the packets the Media Gateway 60 is sending. The Media Gateway 60 does not associate the stream exiting port1 with the stream entering port2.

When a second Media Gateway 60b is involved in the call acting as an outgoing Media Gateway, the method also includes sending the Intercept Router an AddNAT message to create an alias IP address mg2' for the second Media Gateway IP address mg2, and sending control messages to the second Media Gateway to arrange for the second port of the path.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

We claim:

1. A method of intercepting call content bearer packets from first and second communications terminals communicating with each other over a packet-based Internet Protocol (IP) network comprising:
   a Softswitch obtaining alias IP addresses for the first and second communications terminals, the alias IP addresses corresponding to an Intercept Router in the network;
   the Softswitch using the alias IP addresses in call control signaling for redirecting call content bearer packets from the first and second communications terminals through the Intercept Router for interception.

2. The method defined in claim 1 wherein a target having an IP address A communicates with an associate having an IP address B, further comprising:
   the Softswitch communicating the target IP address information A to the Intercept Router; and
   the Softswitch requesting Network Address Translation mappings A' from a pool of addresses for the Intercept Router.

3. The method defined in claim 2 wherein the requesting step comprises:
   the Softswitch sending the intercept Router an AddNAT message to create alias IP addresses A' for the target address A; and
   the Softswitch receiving an AddNAT Response message containing the alias IP address A' from the Intercept Router.

4. The method defined in claim 3 further comprising:
   the Softswitch sending Delete NAT messages to the Intercept Router to remove the temporary NAT mappings creating the alias address A' after the call ends.

5. The method defined in claim 2 wherein an associate using the Public Switched Telephone Network (PSTN) communicates with a target having a forwarded IP address A via a Media Gateway having an IP address mg, wherein the step of the Softswitch communicating the target IP address information A to the Intercept Router comprises:
the Softswitch sending an Add Target message to the Intercept Router containing the Media Gateway IP address mg and UDP port number port1 associated with the target for communicating to the Intercept Router that any bearer packets to or from the target should be intercepted.

6. The method defined in claim 1 wherein a target having an IP address A communicates with an associate having an IP address B, further comprising:
the Softswitch communicating the associate IP address information B to the Intercept Router; and
the Softswitch requesting Network Address Translation mappings B' from a pool of addresses for the Intercept Router.

7. The method defined in claim 6 wherein the requesting step comprises:
the Softswitch sending the Intercept Router an AddNAT message to create alias IP addresses B' for the associate address B; and
the Softswitch receiving an AddNAT Response message containing the alias IP address B' from the Intercept Router.

8. The method defined in claim 7 further comprising:
the Softswitch sending Delete NAT messages to the Intercept Router to remove the temporary NAT mappings creating the alias address B' after the call ends.

9. The method defined in claim 1 wherein the associate using the Public Switched Telephone Network (PSTN) communicates with a target having an IP address A via a Media Gateway having an IP address mg, further comprising:
the Softswitch communicating the target IP address information A to the Intercept Router;
the Softswitch requesting Network Address Translation mappings A' from a pool of addresses for the Intercept Router;
the Softswitch communicating the media gateway IP address information mg to the Intercept Router; and
the Softswitch requesting Network Address Translation mappings mg' from a pool of addresses for the Intercept Router.

10. The method defined in claim 9 further comprising:
the Softswitch sending the Intercept Router an AddNAT message to create alias IP addresses A' for the target address A;
the Softswitch receiving an AddNAT Response message containing the alias IP address A' from the Intercept Router;
the Softswitch sending the Intercept Router an AddNAT message to create alias IP addresses mg' for the media gateway address mg; and
the softswitch recieving an AddNAT Response message containing the alias IP address mg' from the Intecept Router.

11. The method defined in claim 1 wherein an associate using the Public Switched Telephone Network (PSTN) calls a target, the target forwarding calls to a phone which also uses the PSTN, further comprising:
the Softswitch sending an Add Target message to the Intercept Router containing the Media Gateway IP address mg and UDP port number port1 associated with the associate;
the Softswitch requesting Network Address Translation mapping mg to mg' from a pool of addresses for the Intercept Router.

12. The method defined in claim 11 wherein the requesting step comprises:
the Softswitch sending the Intercept Router an AddNAT message to create alias Media Gateway address mg' for the Media Gateway address mg; and
the Softswitch receiving an AddNAT Response message containing the alias IP address mg' from the Intercept Router.

13. The method defined in claim 12 further comprising:
Softswitch sending a control message to the Media Gateway ADD (trunk2, mg'+port1) to arrange for the second port of the bearer path; and
the Softswitch receiving an acknowledgement including the Media Gateway second port number for the bearer path from the Media Gateway.

14. The method defined in claim 13 further comprising:
the Softswitch sending the Media Gateway a message MODIFY(mg'+port2) propagating the Media Gateway second returned port with the alias Media Gateway address mg' to be associated with the Media Gateway first port.

15. The method defined in claim 1 further comprising:
sending an Add Target message to the Intercept Router containing the IP address of the call content bearer packets.

16. The method defined in claim 15 wherein the Add Target message includes the port number of the target bearer packets.

17. The method defined in claim 15 wherein the Add Target message includes the IP address of the Legal Enforcement Agency to which copies of intercepted bearer packets are sent.

18. A method of intercepting call content bearer packets from first and second communications terminals communicating with each other over a packet-based Internet Protocol (IP) network comprising:
receiving call control signaling at a network node including a first IP address corresponding to the first terminal and a second IP address corresponding to the second terminal;
obtaining alias IP addresses for the first and second IP addresses, the alias IP addresses corresponding to an Intercept Router in the network; and
the network node sending call control signaling to the first and second terminals using the alias IP addresses in place of the first and second IP addresses to direct the call content bearer packets from the first and second communications terminals through the Intercept Router for interception.

* * * * *